United States Patent [19]
Grant et al.

[11] Patent Number: 4,826,097
[45] Date of Patent: May 2, 1989

[54] REEL SPINDLE APPARATUS WITH INTERNAL CLAMPING MEMBER

[75] Inventors: Frederic F. Grant, Bellflower; Ionel Mondocea, Glendale, both of Calif.

[73] Assignee: Datatape, Inc., Pasedena, Calif.

[21] Appl. No.: 236,863

[22] Filed: Aug. 26, 1988

[51] Int. Cl.$^4$ .............................................. B65H 18/10
[52] U.S. Cl. .................................... 242/68.3; 242/200
[58] Field of Search ....................... 242/68.3, 200, 201

[56] References Cited

U.S. PATENT DOCUMENTS 4,116,401 9/1978 Evert et al. ......................... 242/68.3
4,592,522 6/1986 Grant .................................. 242/193

Primary Examiner—David Werner
Attorney, Agent, or Firm—William F. Noval

[57] ABSTRACT

In magnetic tape recording apparatus a magnetic tape reel is clamped to a spindle apparatus so that vibration between the spindle apparatus and reel is minimized and so that the reel is operable free of contact with a reel container. A magnetic tape reel having a central opening extending from a face of the reel and, within the opening, a plurality of reel projections with inner radial surfaces spaced from the reel face, is clamped to a tubular spindle member by means of a reel clamping member rotatably mounted at the end of the spindle member. The reel clamping member is actuated by a control member which is slidably mounted within the spindle member.

5 Claims, 3 Drawing Sheets

REEL SPINDLE APPARATUS WITH INTERNAL CLAMPING MEMBER

BACKGROUND OF THE INVENTION

In general this invention relates to magnetic tape recording apparatus. More particularly, this invention relates to magnetic tape recording apparatus in which a magnetic tape reel is clamped to spindle apparatus so that vibration between the spindle apparatus and reel is minimized, and so that the reel is operable free of contact with a reel container.

Magnetic tape recording apparatus are widely used for storing various types of information, including audio and video signals and digital data information. Such information is recorded and reproduced from magnetic tape wound on magnetic tape reels. The magnetic tape reels may be individually mounted on the magnetic tape recorder or may be contained in a cartridge or cassette which is mounted in the magnetic tape recorder. In either case, the magnetic tape reel is engaged by a tape drive so that magnetic tape may be transported past a magnetic head. In such apparatus, it is desirable that the magnetic tape reel be securely clamped to the tape drive mechanism to minimize vibration between the two. It is also desirable that the magnetic tape reel be easily engaged and disengaged from the reel drive mechanism and that clamping of the reel to the drive be effected in a simple and efficient manner. It is further desirable that the reel be supported free from the walls of a cartridge or cassette so that during operation neither the reel nor the tape contacts the container walls. When properly mounted within the recording apparatus, the magnetic tape reel should be properly aligned with other components of the magnetic tape recorder.

U.S. Pat. No. 4,592,522, issued June 3, 1986, Inventor Grant and U.S. Pat. No. 4,116,401, issued Sept. 26, 1978, Inventors Evert et al., disclose coaxial reel magnetic tape recorders in which inner and outer magnetic tape reels are clamped to a spindle drive mechanism. The clamping mechanisms include manually actuatable control members. The clamping mechanisms disclosed in these two patents are disadvantageous because they are mechanically complex and are only accessible from the reel side of the magnetic tape reel. Thus, such clamping mechanisms are not suitable for magnetic tape recorders where access to the reels is difficult, such as when magnetic tape reels are contained in cassettes or cartridges which are loaded through slots or the like into the recorder.

SUMMARY OF THE INVENTION

According to the present invention, there is provided, for use in a magnetic tape recording apparatus, a spindle apparatus having a reel clamping mechanism which securely clamps a magnetic tape reel to a spindle member to minimize vibration between the spindle and the reel. The spindle apparatus of the invention effects easy mounting and dismounting of a reel to the spindle apparatus, as well as proper alignment of a reel relative to other components of the magnetic tape recorder. Moreover, the clamping mechanism is accessible from within the spindle drive apparatus so that clamping and unclamping of a magnetic tape reel to the spindle apparatus may be effected simple, efficiently and automatically.

According to an aspect of the present invention, a magnetic tape reel having a central opening extending from a face of the reel and having a plurality of reel projections within the opening which have inner radial surfaces spaced from the reel face, is clamped to a spindle apparatus by means of a reel clamping member rotatably mounted at the end of a tubular spindle member. The reel clamping member is actuated by a control member which is slidably mounted within the tubular spindle member. According to another feature of the invention, the reel clamping member has an outwardly extending clamping projection with a cam surface, which engages a reel projection, to effect sufficient clamping force on the reel to restrain relative vibration between the reel and the spindle member.

DETAILED DESCRIPTION OF THE PREFERRED EMBODIMENT

The subject matter of the present invention relates to a spindle apparatus for mounting a magnetic tape reel. In the preferred embodiment described below the magnetic tape reel is contained in a cassette or cartridge. It will be understood, however, that the spindle apparatus of the present invention may also be used with magnetic tape reels which are not mounted in a container. It will also be understood that the spindle apparatus of the present invention may be used with reels, upon which are wound web-like material other than magnetic tape.

Figure 1:
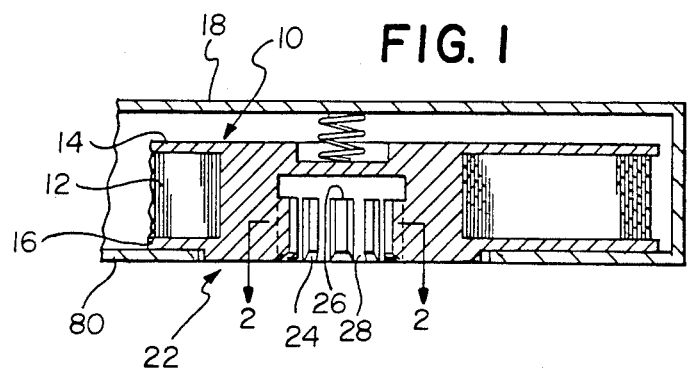
FIG. 1 is a sectional, elevational view of a portion of a cassette which houses a magnetic tape reel.

Referring now to the Figs., there will be described an embodiment of the present invention. As shown in FIG. 1, a magnetic tape reel 10 having a pack of magnetic tape 12 wound between flanges 14 and 16 is contained in a cassette 18 (only a portion of which is shown). Reel 10 has a central opening 20 extending from reel face 22.

Figure 2:
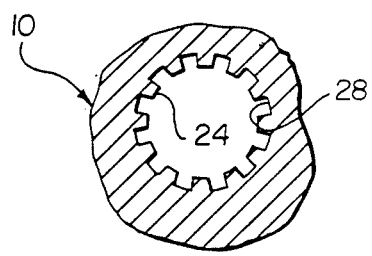
FIG. 2 is a sectional, plan view taken along lines 2—2 of FIG. 1.

Opening 20 has a plurality of spaced reel projections 24 which extend radially inwardly. Projections 24 have inner radial surfaces 26 which are spaced from face 22. As shown more clearly in FIG. 2, projections 24 are equally spaced around opening 20 and have slots 28 between adjacent projections 24.

Figure 3:
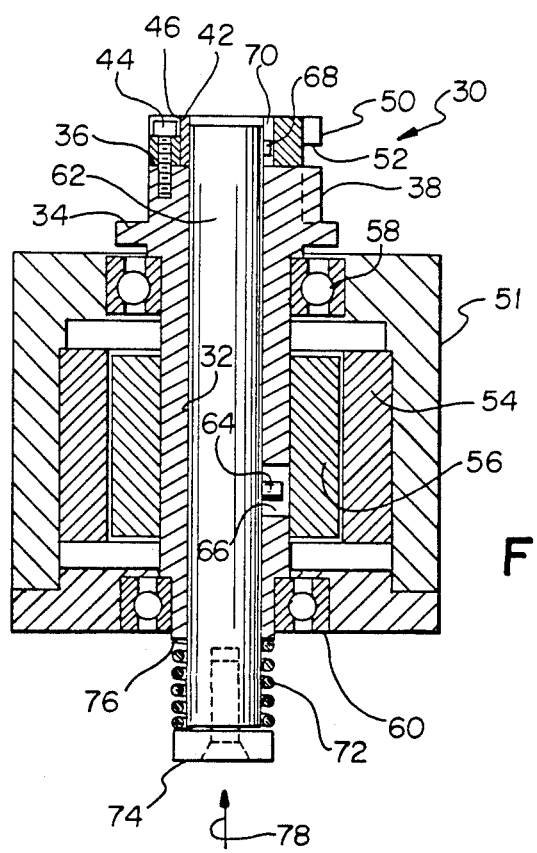
FIG. 3 is a sectional, elevational view of an embodiment of the present invention.
Figure 4:
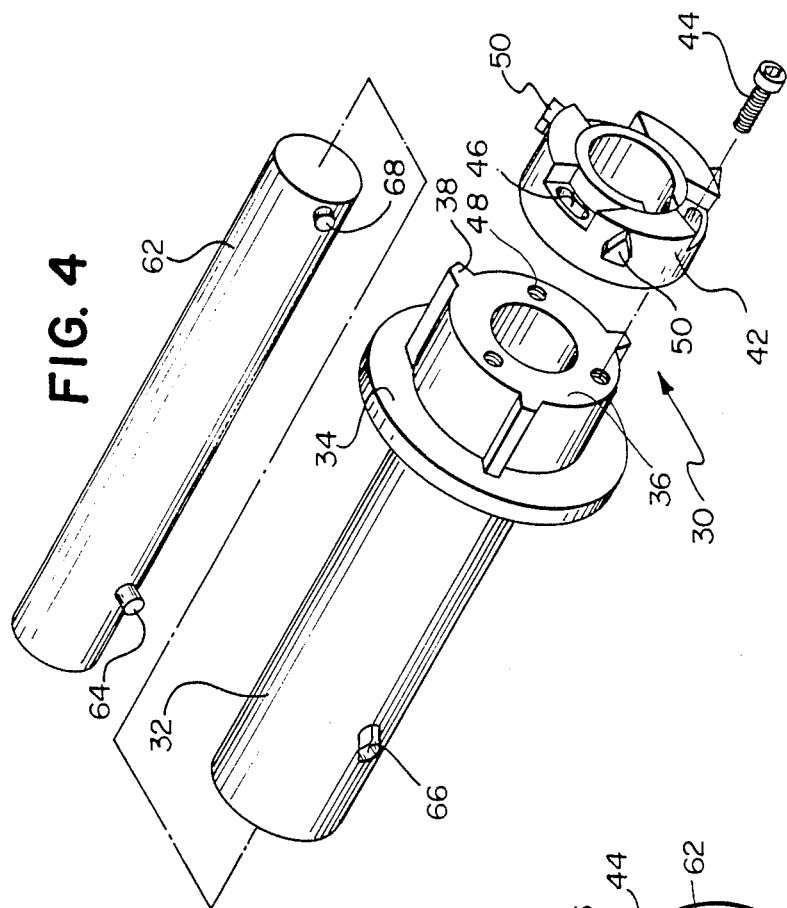
FIG. 4 is an exploded view of the spindle apparatus of FIG. 3.

Referring now to FIGS. 3 and 4, there will be described a preferred embodiment of the present invention. As shown in FIG. 3, spindle apparatus 30 includes a tubular spindle member 32 having a collar 34 located near the reel mounting end 36 of spindle member 32. Spindle member 32 has a plurality of outwardly extending spindle projections 38 which are located between collar 34 and end 36. A reel clamping member 42 is rotatably mounted on the end of spindle member 32 by means of shouldered screws 44 which pass through arcuate slots 46 in member 42 and which screw into openings 48 in the end 36 of spindle member 32.

Clamping member 42 has a plurality of outwardly extending clamping projections 50 having cam surfaces 52 (the function of which will be explained in greater detail later).

Spindle member 32 is driven by means of a brushless direct current motor which includes housing 52, coil 54 and DC magnet assembly 56. Housing 52 is fixedly supported by a member (not shown) of a magnetic tape recorder and rotatably supports spindle member 32 by means of bearings 58 and 60. It will be understood that spindle member 32 may be rotated by a drive assembly other than a DC motor, such as, for example, a belt and pulley arrangement or a gear arrangement.

Figures 5A, 5B:
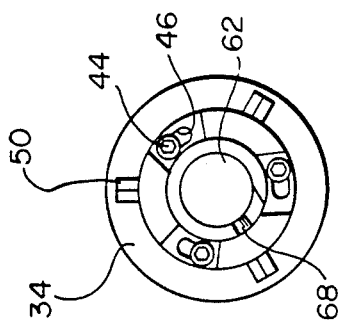
FIGS. 5A and 5B are diagrammatic views useful in describing the operation of the apparatus of FIGS. 3 and 4.

Spindle apparatus 30 also includes a control member 62 which is slidably mounted within tubular spindle member 32. Control member 62 has a first radially extending pin 64, which projects into helical slot 66 in spindle member 32, and a second radially extending pin 68, which projects into axial slot 70 in reel clamping member 42. As shown in FIG. 3, control member 62 is biased by a means of a helical spring 72, coiled on the end of member 62 and captured between cap 74 and end 76 of spindle member 32. Spring 72 normally biases member 62 to a downward position (as shown in FIG. 3). In this position, clamping projections 50 of clamping member 40 are aligned with spindle projections 38 of spindle member 32 (See FIG. 5A). When a force (e.g., by a solenoid or the like) is applied to cap 74 in the direction of arrow 78, control member 62 slides axially in spindle member 32. As member 62 slides, it is also rotated by the movement of pin 64 in helical slot 66. Pin 68 slides axially in slot 70 in clamping member 42. The rotation of member 62 causes rotation of clamping member 42 and movement of clamping projections 50 out of alignment with spindle projections 38 (See FIG. 5B).

When force 78 is removed from control member 62, spring 72 will bias member 62 downwardly, causing rotation of member 42 in the opposite direction. This rotation results in alignment of clamping projections 50 with spindle projections 38.

Figure 6A:
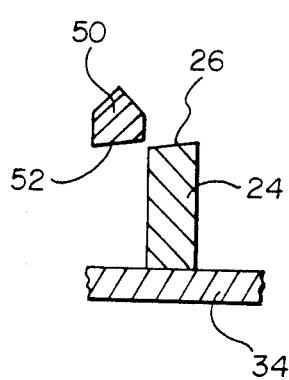
FIGS. 6A and 6B are sectional, elevational views illustrating the clamping operation of the apparatus of FIGS. 3 and 4.
Figure 6B:
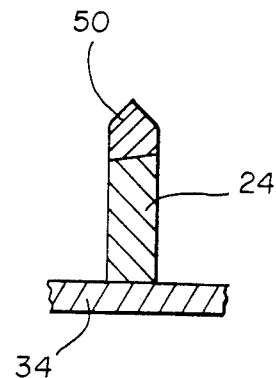

When a reel 10 is mounted on spindle apparatus 30, projections 50 and 38 are in alignment and pass through slots 28 between reel projections 24 of reel 10. Face 22 of reel 10 engages collar 34 of spindle member 32. By applying force in the direction of arrow 78 to control member 62, clamping member 42 is rotated. Clamping projections 50 are moved into engagement with reel projections 24 to clamp reel 10 to spindle apparatus 30. Cam surfaces 52 of clamping projections 50 engage surfaces 26 of reel projections 24 to tend to compress projections 24 between clamping projections 50 and collar 34 (see FIGS. 6A and 6B).

Figure 7:
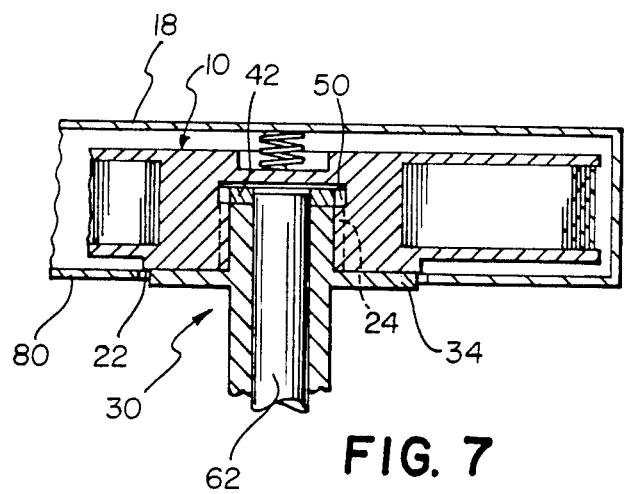
FIG. 7 is a sectional, elevational view of the mounting of the reel of FIG. 1 on the spindle apparatus of FIG. 3.

The clamping action of clamping projections 50 on reel projections 24, firmly clamps reel 10 to spindle apparatus 30 and restrains any relative vibration between the two members. Moreover, the bottom face 22 of reel 10 is raised above wall 80 of cassette 18 so that reel 10 is free to rotate without any contact with cassette 18 (see FIG. 7). Reel 10 is also properly aligned with other components (not shown) of the magnetic tape recording apparatus.

The invention has been described in detail with particular reference to preferred embodiments thereof but it will be understood that variations and modifications can be effected within the spirit and scope of the invention.

What is claimed is:

1. Spindle apparatus for mounting a tape reel having a central opening extending from a face of said reel and a plurality of spaced reel projections within said opening, wherein said projections have inner radial surfaces spaced from said reel face, said spindle apparatus comprising:

a tubular spindle member;
   a collar located near a reel mounting end of said spindle;
   a plurality of spindle projections which extend outwardly from said spindle member and which are located between said collar and said end of said spindle member;
   a reel clamping member rotatably mounted on said end of said spindle member, said clamping member having an outwardly extending clamping projection; and
   a control member which is linked to said clamping member and which is mounted for sliding movement within said tubular spindle member between a first position, at which said clamping projection is in alignment with one of said spindle projections, so that a tape reel may be mounted on said spindle member by passing said spindle projections and said clamping projection between said reel projections and by engaging said reel face with said collar, and a second position at which said clamping projection engages an inner radial surface of one of said reel projections of a said reel, to clamp said reel to said collar of said spindle member.

2. The apparatus of claim 1 wherein said clamping projection of said clamping member has a circumferentially extending cam surface for engaging said reel projection surface, such that, as said clamping member is rotated to said reel clamping position, said clamping projection compresses said reel projection to effect sufficient clamping force on said reel to restrain relative vibration between said reel and said spindle member.

3. The spindle apparatus of claim 1 wherein said spindle member has a helical slot and wherein said control member has a first pin engaging said helical slot, so that when said control member slides in said tubular spindle member it is rotated by the action of said first pin in said helical slot in said spindle member.

4. The spindle apparatus of claim 3 wherein said clamping member has an inner axial slot and wherein said control member has a second pin which engages said axial slot to link said clamping member to said control member, so that as said control member is rotated, said second pin slides in said axial slot and causes rotation of said clamping member.

5. The spindle apparatus of claim 1 wherein said tape reel to be mounted is contained in a reel housing and wherein said spindle member supports a reel mounted thereon so that said reel face does not contact said reel housing.

* * * * *